US006928171B2

(12) United States Patent
Leber

(10) Patent No.: US 6,928,171 B2
(45) Date of Patent: Aug. 9, 2005

(54) CIRCUIT AND METHOD FOR THE ADAPTIVE SUPPRESSION OF NOISE

(75) Inventor: Remo Leber, Bubikon (CH)

(73) Assignee: Bernafon AG, Bern (CH)

(*) Notice: Subject to any disclaimer, the term of this patent is extended or adjusted under 35 U.S.C. 154(b) by 908 days.

(21) Appl. No.: 09/775,204

(22) Filed: Feb. 1, 2001

(65) Prior Publication Data

US 2001/0036284 A1 Nov. 1, 2001

(30) Foreign Application Priority Data

Feb. 2, 2000 (CH) ............................................ 0204/00

(51) Int. Cl.[7] ............................................ H04B 15/00

(52) U.S. Cl. .................................. 381/94.1; 381/71.11

(58) Field of Search ............................ 381/94.2, 94.1, 381/66, 71.11, 318, 93, 92; 708/322

(56) References Cited

U.S. PATENT DOCUMENTS 5,590,205 A * 12/1996 Popovich ................. 381/71.11
5,963,651 A * 10/1999 Van Veen et al. ........ 381/71.11
6,577,675 B2 * 6/2003 Lindgren et al. ........... 375/148
6,625,587 B1 * 9/2003 Erten et al. .................... 706/22
6,691,073 B1 * 2/2004 Erten et al. ................. 702/190
6,704,369 B1 * 3/2004 Kawasaki et al. .......... 375/285

OTHER PUBLICATIONS

"A simple adaptive first–order differential microphone", Gary W. Elko, Anh–Tho Nguyen Pong, Acoustics Research Department, AT&T Bell Laboratories, Murray Hill, NJ 07974.

"An Alterntive Approach to Linearly Constrained Adaptive Beamforming", Lloyd J. Griffiths, Senior Member, IEEE, and Charles W. Jim, IEEE Transactions on Antennas and Propagation, vol. AP–30, No. 1, Jan. 1982, pp. 27–34.

"Blind Signal Separation by Second Order Statistics", Henrik Sahlin, Department of Signals and Systems, School of Electrical and Computer Engineering, Chalmers University of Technology, Sweden 1998.

* cited by examiner

*Primary Examiner*—Forester W. Isen
*Assistant Examiner*—Corey Chau
(74) *Attorney, Agent, or Firm*—Rankin, Hill, Porter & Clark LLP

(57) ABSTRACT

The circuit for adaptive suppression of noise is a component part of a digital-hearing aid, consists of two microphones (1, 2), two AD—converters (3, 4), two compensating filters (5, 6), two retarding elements (7, 8), two subtractors (9, 10), a processing unit (11), a DA—converter (13), an earphone (15) as well as the two filters (17, 18). The method for adaptive suppression of noise can be implemented with the indicated circuit. The two microphones (1, 2), provide two differing electric signals ($d_1(t)$, $d_2(t)$), which are digitalized in the two AD—converters (3, 4) and pre-processed together with the two fixed compensation filters (5, 6). Downstream the compensation filters are arranged the two filters (17, 18) symmetrically crosswise in a forward direction and having adaptive filter coefficients ($w_1$, $w_2$). The filter coefficients ($w_1$, $w_2$) are calculated by a stochastic gradient procedure and updated in real time while minimizing a quadratic cost function consisting of cross-correlation terms. As a result of this, spectral differences of the input signals are selectively amplified. With a suitable positioning of the microphones (1, 2) or selection of the directional characteristics, the signal to noise ratio of output signals ($s_1$, $s_2$) compared to that of the individual microphone signals ($d_1(t)$, $d_2(t)$) can be significantly increased. Preferably, one of the two improved output signals ($s_1$, $s_2$) within one of the processing units (11, 12) is subjected to the usual processing specific to hearing aids, sent to one of the DA—converters (13, 14) and acoustically output once again through one of the earphones (15, 16). Four additional cross-over element filters (19–22) carry out a signal-dependent transformation of the input and output signals ($y_1$, $y_2$; $s_1$, $s_2$), and solely the transformed signals are utilized for the updating of the filter coefficients ($w_1$, $w_2$). This makes possible a rapidly reacting, and nonetheless calculation-efficient updating of the filter coefficients ($w_1$, $w_2$), and in contrast to other methods only causes minimal audible distortions.

11 Claims, 5 Drawing Sheets

CIRCUIT AND METHOD FOR THE ADAPTIVE SUPPRESSION OF NOISE

BACKGROUND OF THE INVENTION

The invention presented here concerns a circuit and a method for the adaptive suppression of noise such as may be used in digital hearing aids.

The healthy human sense of hearing makes it possible to concentrate on one discussion partner in an acoustic situation, which is disturbed by noise. Many people wearing a hearing aid, however, suffer from a strongly-reduced speech intelligibility, as soon as, in addition to the desired speech signal, interfering background noise is present.

Many methods for the suppression of interfering background noise have been suggested. They can be split-up into single channel methods, which require only one input signal, and into multi-channel methods, which by means of several acoustic inputs make use of the spatial information in the acoustic signal.

In case of all single channel methods, up until now no relevant improvement of the speech intelligibility could be proven. Solely an improvement of the subjectively perceived signal quality is achieved. In addition, these methods fail in that instance important in practice, in which both the useful—as well as the interfering signals are speech (so-called cocktail party situation). None of the single channel methods is in a position to selectively emphasize an individual speech signal from a mixture.

In case of the multi-channel methods for the suppression of noise, one departs from the assumption, that the acoustic source, from which the useful signal is emitted, is situated in front of the listener, while the interfering noise impinges from other directions. This simple assumption proves successful in practice and accommodates the supporting lip-reading. The multi-channel methods can be further subdivided into fixed systems, which have a fixed predefined directional characteristic, and into adaptive systems, which adapt to the momentary noise situation.

The fixed systems operate either with the use of directional microphones, which have two acoustic inputs and which provide an output signal dependent on the direction of impingement, or with the use of several microphones, the signals of which are further processed electrically. Manual switching under certain circumstances enables the choice between different directional characteristics. Systems of this type are available on the market and are increasingly also being incorporated into hearing aids.

From the adaptive systems under development at the present time one has the hope, that they will optimally suppress interfering noise in dependence of the momentary situation and therefore be superior to the fixed systems. An approach with an adaptive directional microphone was presented in Gary W. Elko and Anh-Tho Nguyen Pong, "A Simple Adaptive First-Order Differential Microphone", 1995 IEEE ASSP Workshop on Applications of Signal Processing to Audio and Acoustics, New Paltz, N.Y. In that solution, the shape of the directional characteristic is adjusted in function of the signal by means of an adaptive parameter. As a result of this, an individual signal impinging from the side can be suppressed. Due to the limitation to a single adaptive parameter, the system only works in simple sound situations with a single interfering signal.

Numerous investigations have been carried out using two microphones, each of which is located at one ear. In the case of these so-called adaptive beam formers, the sum—and the difference signal of the two microphones are utilized as input for an adaptive filter. The foundations for this kind of processing were published by L. J. Griffiths and C. W. Jim, "An Alternative Approach to Linearly Constrained Adaptive Beamforming", IEEE Transactions on Antennas and Propagation, vol. AP-30 No. 1 pp. 27–34, January 1982. These Griffiths-Jim—beam formers can also operate with more than two microphones. Interfering noises can be successfully suppressed with them. Problems, however, are created by the spatial echoes, which are present in real rooms. In extreme cases this can lead to the situation that, instead of the interfering signals, the useful signal is suppressed or distorted.

In the course of the past years, great progress has been made in the field of so-called blind signal separation. A good compilation of the research results to date can be found in Te-Won Lee, "Independent Component Analysis, Theory and Applications", Kluwer Academic Publishers, Boston, 1998. In it, one departs from an approach, in which M statistically independent source signals are received by N sensors in differing mixing ratios (M and N are natural numbers), whereby the transmission functions from the sources to the sensors are unknown. It is the objective of the blind signal separation to reconstruct the statistically independent source signals from the known sensor signals. This is possible in principle, if the number of sensors N corresponds at least to the number of sources M, i.e., $N \geqq M$. A great number of different algorithms have been suggested, whereby most of them are not at all suitable for an efficient processing in real time.

Considered as a sub-group can be those algorithms that, instead of the statistical independence, only call for a non-correlation of the reconstructed source signals. These approaches have been comprehensively investigated by Henrik Sahlin, "Blind Signal Separation by Second Order Statistics", Chalmers University of Technology Technical Report No. 345, Göteborg, Sweden, 1998.

He was able to prove, that the requirement of uncorrelated output signals is entirely sufficient for acoustic signals. Thus, for example, the minimization of a quadratic cost function consisting of cross-correlation terms can be carried out with a gradient process. In doing so, filter coefficients are changed step-by-step in the direction of the negative gradient. A process of this type is described in Henrik Sahlin and Holger Broman, "Separation of Real World Signals", Signal Processing vol. 64 No. 1, pp. 103–113, January 1998. There it is utilized for the noise suppression in a mobile telephone.

SUMMARY OF THE INVENTION

It is an object of the present invention to indicate a circuit and a method for the adaptive suppression of noise, which are based on the known systems, which, however, are superior to these in essential characteristics. In particular, with an as small as possible effort an optimum convergence behaviour with minimal, inaudible distortions and without any additional signal delay shall be achieved.

The invention presented here belongs to the group of systems for the blind signal separation by means of methods of the second order, i.e., with the objective of achieving uncorrelated output signals. In essence, two microphone signals are separated into useful signal and interfering signals by means of blind signal separation. A consistent characteristic at the output can be achieved, if the signal to noise ratio of a first microphone is always greater than that of a second microphone. This can be achieved either by the first microphone being positioned closer to the useful source than the second microphone, or by the first microphone, in contrast to the second microphone, possessing a directional characteristic aligned to the useful source.

The calculation of the de-correlated output signals is carried out with the minimization of a quadratic cost function consisting of cross-correlation terms. To do this, a special stochastic gradient process is derived, in which expectancy values of cross-correlations are replaced by their momentary values. This results in a rapidly reacting and efficient to calculate updating of the filter coefficients.

A further difference to the generally known method consists of the fact that, for updating the filter coefficients, signal-dependent transformed versions of the input—and output signals are utilized. The transformation by means of cross-over element filters implements a spectral smoothing, so that the signal powers are distributed more or less uniformly over the frequency spectrum. As a result of this, during the updating of the filter coefficients all spectral components are uniformly weighted, independent of the currently present power distribution. This also for real acoustic signals with not to be neglected auto-correlation functions makes possible a low-distortion processing simultaneously with a satisfactory convergence characteristic.

For an optimum functioning of the circuit in accordance with the invention and of the method in accordance with the invention, the microphone inputs can be equalized to one another with compensation filters. A uniform standardizing value for the updating of all filter coefficients is utilized. It is calculated such that in all cases only one of the two filters is adapted with maximum speed, depending on the circumstance of whether at the moment useful signal or interfering noise signals are dominant. This procedure makes possible a correct convergence even in the singular case, in which only the useful signal or only interfering noise signals are present.

The invention presented here essentially differs from all systems for the suppression of noise published up until now, in particular by the special stochastic gradient process, the transformation of the signals for the updating of the filter coefficients as well as by the interaction of compensation filters and standardization unit in the controlling of the adaptation speed.

Overall, the system in accordance with the invention within a very great range of signal to noise ratios manifests a consistent characteristic, i.e., the signal to noise ratio is always improved and never degraded. It is therefore in a position to make an optimum contribution to better hearing in difficult acoustic situations.

BRIEF DESCRIPTION OF THE DRAWINGS

In the following, the invention is described in detail on the basis of Figures.

These in the form of block diagrams illustrate.

DETAILED DESCRIPTION OF THE PREFERRED EMBODIMENT

Figure 1:
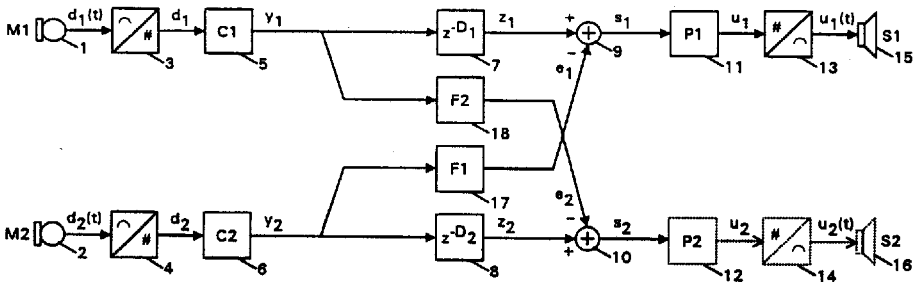
FIG. 1 a general system for the adaptive suppression of noise by means of the method of the blind signal separation in accordance with the state of prior art, FIG. 2 the system in accordance with the invention, FIG. 3 a detailed drawing of a compensation filter of the system in accordance with the invention, FIG. 4 a detailed drawing of a retarding element of the system in accordance with the invention, FIG. 5 a detailed drawing of a filter of the system in accordance with the invention, FIG. 6 a detailed drawing of a cross-over element filter of the system in accordance with the invention, FIG. 7 a detailed drawing of a cross-correlator of the system in accordance with the invention, FIG. 8 a detailed drawing of a pre-calculation unit of the type V of the system in accordance with the invention, FIG. 9 a detailed drawing of a pre-calculation unit of the type B of the system in accordance with the invention, FIG. 10 a detailed drawing of an updating unit of the system in accordance with the invention, FIG. 11 a detailed drawing of a cross-over element de-correlator of the system in accordance with the invention, FIG. 12 a detailed drawing of a smoothing unit of the system in accordance with the invention, and FIG. 13 a detailed drawing of a standardization unit of the system in accordance with the invention.

A general system for the adaptive noise suppression by means of the method of the blind signal separation, as it is known from prior art, is illustrated in FIG. 1. Two microphones 1 and 2 provide the electric signals $d_1(t)$ and $d_2(t)$. The following AD—converters 3 and 4 from these calculate digital signals at the discrete points in time $d_1(n \cdot T)$ and $d_2(n.T)$, in abbreviated notation $d_1(n)$ and $d_2(n)$ or $d_1$ and $d_2$. In this, $T=1/f_s$ is the scanning period, $f_s$ the scanning frequency and n a consecutive index. Following then are the compensation filters 5 and 6 that, depending on the application, can carry out a fixed frequency response correction on the individual microphone signals. The input signals $y_1$ and $y_2$ resulting from this are now in accordance with FIG. 1 brought both to retarding elements 7 and 8 as well as to filters 17 and 18. Subtractors 9 and 10 following supply output signals $s_1$ and $s_2$.

Following afterwards are processing units 11 and 12 that, depending on the application, carry out any linear or non-linear post-processing required. Their output signals $u_1$ and $u_2$ through DA—converters 13 and 14 can be converted into electric signals $u_1(t)$ and $u_2(t)$ and made audible by means of loudspeakers, resp., earphones 15 and 16.

It is the objective of the blind signal separation, starting out from the input signals $y_1$ and $y_2$ and by means of the filters Filter 17 and 18, to obtain output signals $s_1$ and $s_2$, which are statistically independent to as great an extent as possible. For those acoustic signals, which are stationary respectively only for a short time period, the requirement of uncorrelated output signals $s_1$ and $s_2$ is sufficient. For the calculation of the optimum filter coefficients $\underline{w}_1$ and $\underline{w}_2$ in the filters 17 and 18, we shall minimize a cost function. This is the following quadratic cost function J consisting of cross-correlation terms. In it, the operator * stands for conjugate-complex in applications, where we are dealing with complex-value signals.

$$J = \sum_{l=-L_l}^{L_u} |R_{s_1 s_2}(l)|^2 = \sum_{l=-L_l}^{L_u} R_{s_1 s_2}(l) \cdot R^*_{s_1 s_2}(l)$$

The cross-correlation terms can be expressed with the help of the output signals $s_1$ and $s_2$. In doing so, the operator E[] stands for the expectancy value.

$$R_{s_1 s_2}(l) = E[s_1^*(n) \cdot s_2(n+l)]$$

The output signals $s_1$ and $s_2$ can be expressed by the input signals $y_1$ and $y_2$ and by means of the filter coefficients $\underline{w}_1$ and $\underline{w}_2$. In doing so, $w_{1k}$ designates the elements of the vector $\underline{w}_1$ and $w_{2k}$ the elements of the vector $\underline{w}_2$.

$$s_1(n) = y_1(n - D_1) - \sum_{k=0}^{N_1} w_{1k}^*(n) \cdot y_2(n-k)$$

$$s_2(n) = y_2(n - D_2) - \sum_{k=0}^{N_2} w_{2k}^*(n) \cdot y_1(n-k)$$

For the minimization of the cost function J by means of a gradient process, the derivations with respect to the filter coefficients $\underline{w}_1$ and $\underline{w}_2$ have to be calculated. After a few transformations, we obtain the following expressions.

$$\frac{\partial J}{\partial w_{1k}(n)} = -2 \cdot \sum_{l=-L_l}^{L_u} R_{y_2 s_2}^*(k+l) \cdot R_{s_1 s_2}(l)$$

$$\frac{\partial J}{\partial w_{2k}(n)} = -2 \cdot \sum_{l=-L_l}^{L_u} R_{y_1 s_1}^*(k-l) \cdot R_{s_1 s_2}^*(l)$$

For the deduction of the stochastic gradient process in accordance with the invention, now the summation limits have to be replaced by limits dependent on the coefficient index. To carry this out, the following substitutions are necessary.

$$L_1 = L_2 - D_2 + k \quad L_u = L_2 + D_2 - k$$

$$L_1 = L_1 + D_1 - k \quad L_u = L_1 - D_1 = k$$

The derivations can now be expressed with the modified summation limits.

$$\frac{\partial J}{\partial w_{1k}(n)} = -2 \cdot \sum_{l=-(L_2-D_2)}^{L_2+D_2} R_{y_2 s_2}^*(l) \cdot R_{s_1 s_2}(l-k)$$

$$\frac{\partial J}{\partial w_{2k}(n)} = -2 \cdot \sum_{l=-(L_1-D_1)}^{L_1+D_1} R_{y_1 s_1}^*(l) \cdot R_{s_1 s_2}(k-l)$$

During the transition from the normal gradient to the stochastic gradient, expectancy values are substituted by momentary values. In the case of the method in accordance with the invention, this is carried out for the cross-correlation terms of the output signals $s_1$ and $s_2$. In doing so, the latest available momentary values are made use of in accordance with the following relationship.

$$R_{s_1 s_2}(l) = E[s_1^*(n) \cdot s_2(n+l)] \approx \begin{cases} s_1^*(n) \cdot s_2(n+l) & (l < 0) \\ s_1^*(n-l) \cdot s_2(n) & (l \geq 0) \end{cases}$$

By the insertion of the momentary values, the calculation of the derivations is simplified and we obtain the following relationships. The intermediate values $v_1$, $b_1$, $v_2$ and $b_2$ make possible a simplified notation and also a simplified calculation, because at any discrete point in time of every value respectively only one new value has to be calculated. As a result of this novel procedure, in the method according to the present invention the calculation effort is significantly reduced.

$$v_1(n) = \sum_{l=0}^{L_2+D_2} R_{y_2 s_2}^*(l) \cdot s_1^*(n-l)$$

$$b_1(n) = \sum_{l=-(L_2-D_2)}^{-1} R_{y_2 s_2}^*(l) \cdot s_2(n+l)$$

$$v_2(n) = \sum_{l=0}^{L_1+D_1} R_{y_1 s_1}^*(l) \cdot s_2^*(n-l)$$

$$b_2(n) = \sum_{l=-(L_1-D_1)}^{-1} R_{y_1 s_1}^*(l) \cdot s_1(n+l)$$

$$\frac{\partial J}{\partial w_{1k}(n)} = -2 \cdot [v_1(n) \cdot s_2(n-k) + b_1(n-k) \cdot s_1^*(n)]$$

$$\frac{\partial J}{\partial w_{2k}(n)} = -2 \cdot [v_2(n) \cdot s_1(n-k) + b_2(n-k) \cdot s_2^*(n)]$$

The updating of the filter coefficients $\underline{w}_1$ and $\underline{w}_2$ now takes place in the direction of the negative gradient. In doing this, $\mu$ is the width of the step. One obtains a relationship similar to the familiar LMS—algorithm (Least Mean Square). The two terms per coefficient are solely necessary, because for the momentary value we have utilized the respectively latest estimated values. This makes sense, if we want to achieve a rapidly reacting behaviour characteristic.

$$w_{1k}(n+1) = w_{1k}(n) + \mu \cdot [v_1(n) \cdot s_2(n-k) + b_1(n-k) \cdot s_1^*(n)]$$

$$w_{2k}(n+1) = w_{2k}(n) + \mu \cdot [v_2(n) \cdot s_1(n-k) + b_2(n-k) \cdot s_2^*(n)]$$

In order to obtain a uniform behaviour characteristic, we formulate a standardized version for the updating of the filter coefficients $\underline{w}_1$ and $\underline{w}_2$. The standardization value has to be proportional to the square of a power value $p_1$, resp., $p_2$. In this, $\beta$ is the adaptation speed.

$$w_{1k}(n+1) = w_{1k}(n) + \frac{\beta}{[p_1(n)]^2} \cdot [v_1(n) \cdot s_2(n-k) + b_1(n-k) \cdot s_1^*(n)]$$

$$w_{2k}(n+1) = w_{2k}(n) + \frac{\beta}{[p_2(n)]^2} \cdot [v_2(n) \cdot s_1(n-k) + b_2(n-k) \cdot s_2^*(n)]$$

The system described up to now for the adaptive suppression of noise by means of the method of the blind signal separation, because of the not to be neglected auto-correlation function of real acoustic signals, is not yet sufficient to achieve a processing with low distortion and with a simultaneously satisfactory convergence characteristic in a realistic environment. The system can be improved, if updating of the filter coefficients $\underline{w}_1$ and $\underline{w}_2$ is not directly based on the input signals $y_1$ and $y_2$ and the output signals $s_1$ and $s_2$, but rather on transformed signals.

Figure 2:
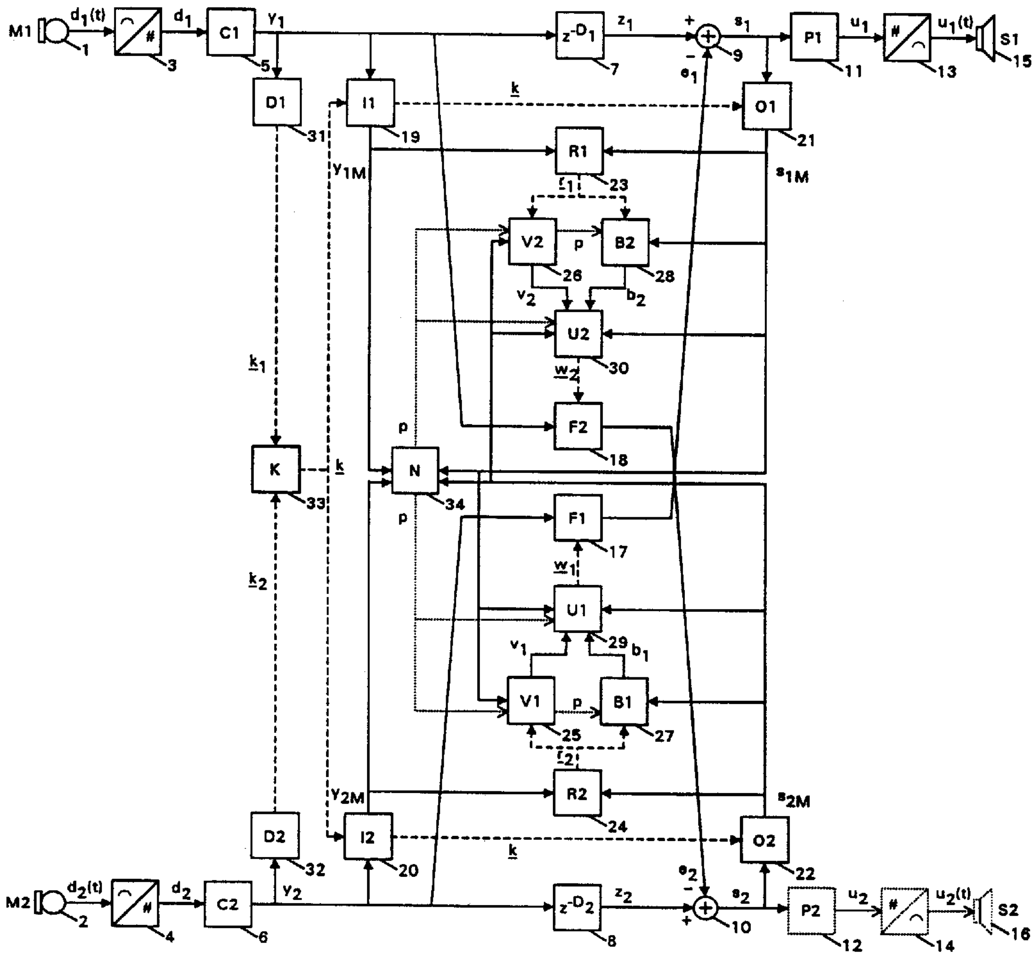

The system in accordance with the invention according to FIG. 2 utilizes four cross-over element filters 19, 20, 21 and 22 for the signal-dependent transformation of the input and output signals. For the rapid signal-dependent transformation, the cross-over element filter structures known from speech signal processing prove to be particularly suitable. There they are utilized for the linear prediction.

For the determination of the coefficients $\underline{k}$ of the cross-over element filters, two cross-over element de-correlators 31 and 32 and a smoothing unit 33 are present. The cross-over element de-correlators each respectively determine a coefficient vector $\underline{k}_1$ and $\underline{k}_2$ based on the input signals $y_1$ and $y_2$. In the smoothing unit, the mean of the two coefficient vectors is taken and smoothed over time is passed on to the cross-over element filters as coefficient vector $\underline{k}$.

In contrast to the known system from FIG. 1, in the system in accordance with the invention all calculations for the updating of the coefficients are based on the transformed input—and output signals $y_{1M}$, $y_{2M}$, $s_{1M}$ and $s_{2M}$. Two cross-correlators 23 and 24 calculate the necessary cross-correlation vectors $\underline{r}_1$ and $\underline{r}_2$. The pre-calculation units 25, 26, 27 and 28 determine the intermediate values $v_1$, $v_2$, $b_1$ and $b_2$. The updating units 29 and 30 determine the modified filter coefficients $\underline{w}_1$ and $\underline{w}_2$ and make them available to the filters 17 and 18.

In the standardization unit 34, a common standardization value p is calculated for the updating of the filter coefficients $\underline{w}_1$ and $\underline{w}_2$. The optimum selection of the standardization value p together with the correct adjustment of the compensation filters 5 and 6 assure a clean and unequivocal convergence characteristic of the method in accordance with the invention.

In the following, a special embodiment of the invention presented here is described in more detail starting out from FIG. 2. The microphones 1 and 2, the AD—converters 3 and 4, the DA—converters 13 and 14 as well as the earphones 15 and 16 are assumed to be ideal in the consideration. The characteristics of the real acoustic—and electric converters can be taken into consideration in the compensation filters 5 and 6, resp., in the processing units 11 and 12 and, if so required, compensated. For the AD—converters 3 and 4 and the DA—converters 13 and 14, the following relationships are applicable. In these, T and $f_s$ designate the scanning period, resp., the scanning frequency and the index n the discrete point in time.

$$d_1(n{\cdot}T) \Rightarrow d_1(n) u_1(n) \Rightarrow u_1(n{\cdot}T)$$

$$d_2(n{\cdot}T) \Rightarrow d_2(n) u_2(n) \Rightarrow u_2(n{\cdot}T)$$

$$T=1/f, f_s=16 \text{ kHz}$$

Figure 3:
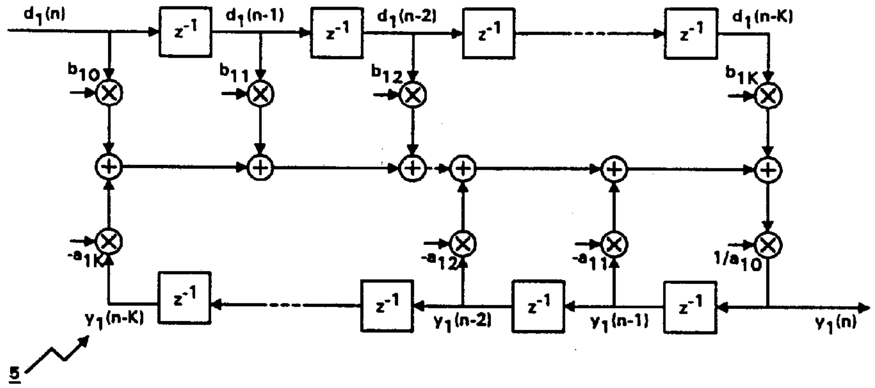

The compensation filter 5 and 6 are designed in accordance with FIG. 3 and the following relationships are applicable. The structure corresponds to a general recursive filter of the order K. The coefficients $b_{1k}$, $a_{1k}$, $b_{2k}$ and $a_{2k}$ are set in such a manner, that the mean frequency response on one input equalizes to the other input. In doing so, in preference a mean is taken over all possible locations of acoustic signal sources, resp., over all possible directions of impingement.

$$y_1(n) = \frac{1}{a_{10}} \cdot \left[ \sum_{k=0}^{K} b_{1k} \cdot d_1(n-k) - \sum_{k=1}^{K} a_{1k} \cdot y_1(n-k) \right]$$

$$y_2(n) = \frac{1}{a_{20}} \cdot \left[ \sum_{k=0}^{K} b_{2k} \cdot d_2(n-k) - \sum_{k=1}^{K} a_{2k} \cdot y_2(n-k) \right]$$

$$K = 2$$

Figure 4:
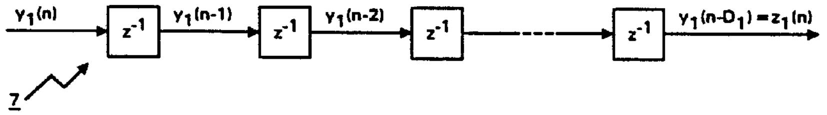

The retarding elements 7 and 8 are designed in accordance with FIG. 4 and the following relationships are applicable. The necessary retarding times $D_1$ and $D_2$ are primarily dependent on the distance of the two microphones and on the preferred sound impingement direction. Small retarding times are desirable, because with this also the overall delay time of the system is reduced.

$$z_1(n)=y_1(n-D_1)$$

$$z_2(n)=y_2(n-D_2)$$

$$D_1=D_2=1$$

For the subtractors 9 and 10, the following relationships are applicable.

$$s_1(n)=z_1(n)-e_1(n)$$

$$s_2(n)=z_2(n)-e_2(n)$$

For the processing units 11 and 12, the following relationships are applicable. The functions $f_1(\ )$ and $f_2(\ )$ stand for any linear or non-linear functions and their arguments. They result on the basis of the conventional processing specific to hearing aids.

$$u_1(n)=f_1(s_1(n), s_1(n-1), s_1(n-2), \ldots)$$

$$u_2(n)=f_2(s_2(n), s_2(n-1), s_2(n-2), \ldots)$$

Figure 5:
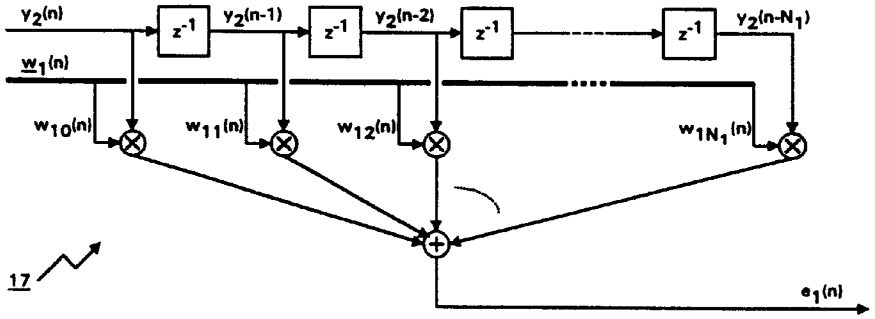

The filters 17 and 18 are designed in accordance with FIG. 5 and the following relationships are applicable. The filter orders $N_1$ and $N_2$ are the result of a compromise between achievable effect and the calculation effort.

$$e_1(n) = \sum_{k=0}^{N_1} w_{1k}(n) \cdot y_2(n-k)$$

$$e_2(n) = \sum_{k=0}^{N_2} w_{2k}(n) \cdot y_1(n-k)$$

$$N_1 = N_2 = 63$$

Figure 6:
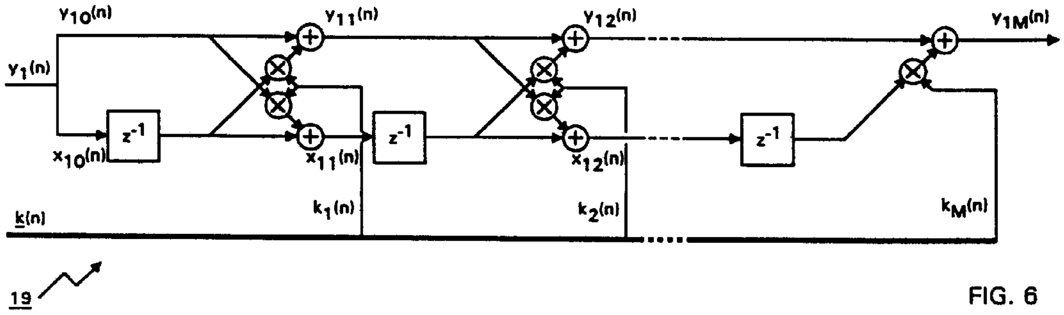

The cross-over element filters 19, 20, 21 and 22 are designed in accordance with FIG. 6 and the following relationships are applicable. The filter order M can be selected as quite small.

$$y_{10}(n) = y_1(n)$$

$$x_{10}(n) = y_1(n)$$

$$\left.\begin{aligned} y_{1i}(n) &= y_{1(i-1)}(n) + k_i(n) \cdot x_{1(i-1)}(n-1) \\ x_{1i}(n) &= k_i(n) \cdot y_{1(i-1)}(n) + x_{1(i-1)}(n-1) \end{aligned}\right\} (1 \le i \le M)$$

$$y_{20}(n) = y_2(n)$$

$$x_{20}(n) = y_2(n)$$

$$\left.\begin{aligned} y_{2i}(n) &= y_{2(i-1)}(n) + k_i(n) \cdot x_{2(i-1)}(n-1) \\ x_{2i}(n) &= k_i(n) \cdot y_{2(i-1)}(n) + x_{2(i-1)}(n-1) \end{aligned}\right\} (1 \le i \le M)$$

$$s_{10}(n) = s_1(n)$$

$$x_{30}(n) = s_1(n)$$

$$\left.\begin{aligned} s_{1i}(n) &= s_{1(i-1)}(n) + k_i(n) \cdot x_{3(i-1)}(n-1) \\ x_{3i}(n) &= k_i(n) \cdot s_{1(i-1)}(n) + x_{3(i-1)}(n-1) \end{aligned}\right\} (1 \le i \le M)$$

$$s_{20}(n) = s_2(n)$$

$$x_{40}(n) = s_2(n)$$

$$\left.\begin{aligned} s_{2i}(n) &= s_{2(i-1)}(n) + k_i(n) \cdot x_{4(i-1)}(n-1) \\ x_{4i}(n) &= k_i(n) \cdot s_{2(i-1)}(n) + x_{4(i-1)}(n-1) \end{aligned}\right\} (1 \le i \le M)$$

$$M = 2$$

Figure 7:
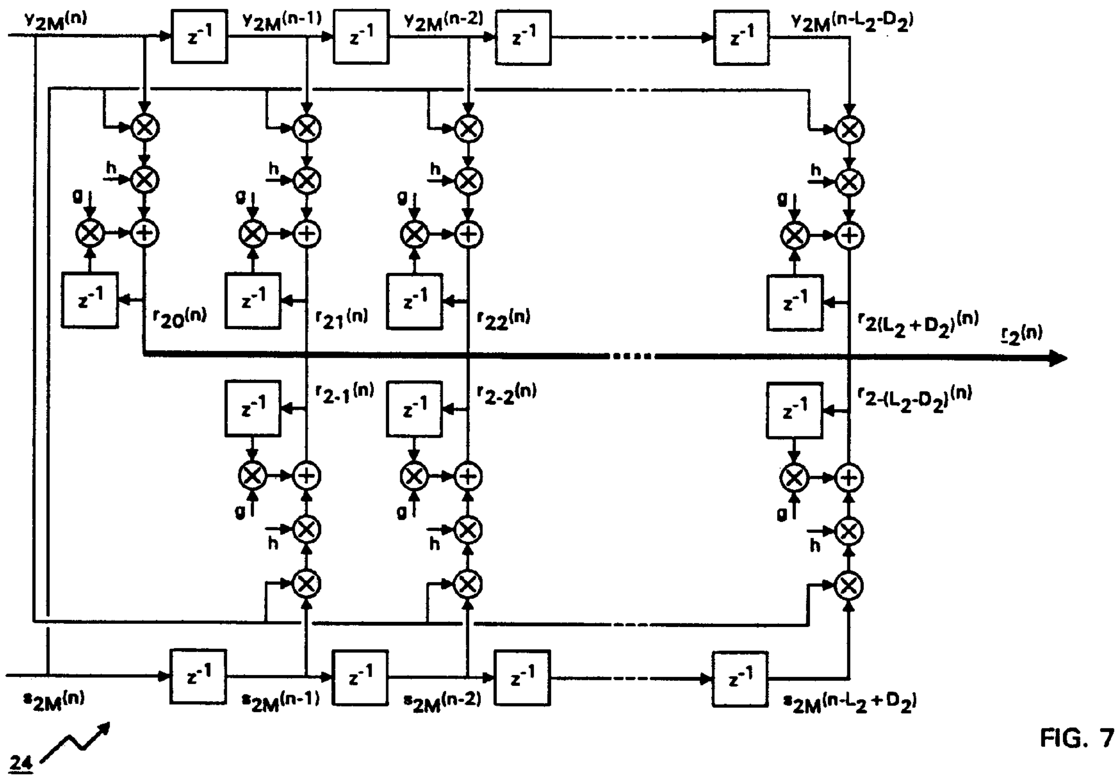

The cross-correlators 23 and 24 are designed in accordance with FIG. 7 and the following relationships are applicable. The constants g and h, which determine the time characteristic of the averaged cross-correlators, should be adapted to the filter orders $N_1$ and $N_2$. The constants $L_1$ and $L_2$ determine, how many cross-correlation terms are respectively taken into consideration in the following calculations.

$$r_{1k}(n)=\begin{cases} g\cdot r_{1k}(n-1)+h\cdot y_{1M}(n)\cdot s_{1M}(n+k) & (-(L_1-D_1)\le k\le -1)\\ g\cdot r_{1k}(n-1)+h\cdot y_{1M}(n-k)\cdot s_{1M}(n) & (0\le k\le (L_1+D_1))\end{cases}$$

$$r_{2k}(n)=\begin{cases} g\cdot r_{2k}(n-1)+h\cdot y_{2M}(n)\cdot s_{2M}(n+k) & (-(L_2-D_2)\le k\le -1)\\ g\cdot r_{2k}(n-1)+h\cdot y_{2M}(n-k)\cdot s_{2M}(n) & (0\le k\le (L_2+D_2))\end{cases}$$

$$g=63/64 \quad h=1-g=1/64$$

$$L_1=L_2=31$$

Figure 8:
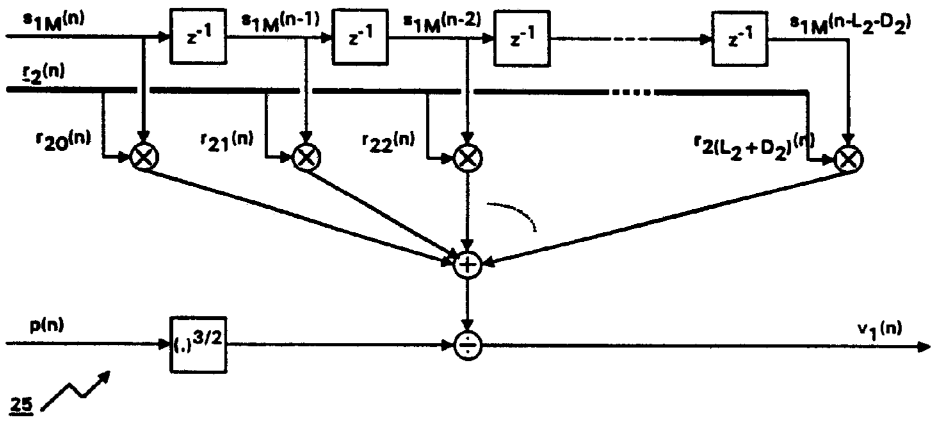

The pre-calculation units of the type V 25 and 26 are designed in accordance with FIG. 8 and the following relationships are applicable. The standardization has been selected in such a manner, that the intermediate values $v_1$ and $v_2$ are dimensionless.

$$v_1(n)=\frac{1}{[p(n)]^{\frac{3}{2}}}\cdot\left[\sum_{k=0}^{L_2+D_2} r_{2k}(n)\cdot s_{1M}(n-k)\right]$$

$$v_2(n)=\frac{1}{[p(n)]^{\frac{3}{2}}}\cdot\left[\sum_{k=0}^{L_1+D_1} r_{1k}(n)\cdot s_{2M}(n-k)\right]$$

Figure 9:
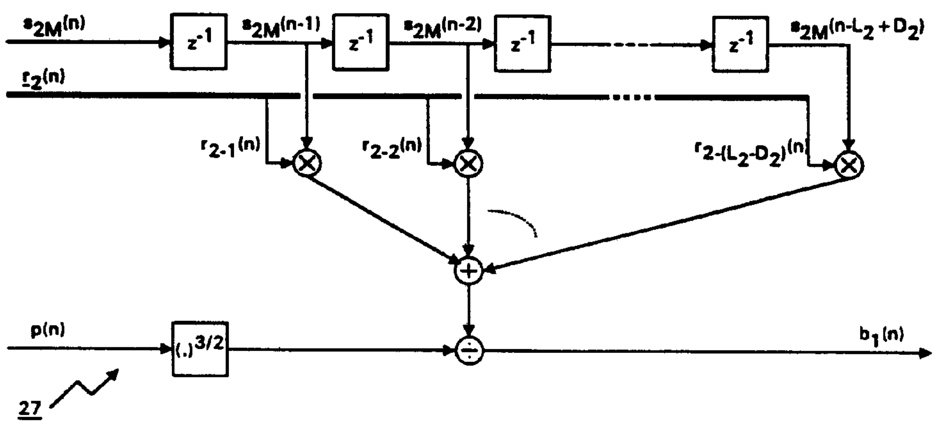

The pre-calculation units of the type B 27 and 28 are designed in accordance with FIG. 9 and the following relationships are applicable. The standardization has been selected in such a manner, that the intermediate values $b_1$ and $b_2$ are dimensionless.

$$b_1(n)=\frac{1}{[p(n)]^{\frac{3}{2}}}\cdot\left[\sum_{k=-(L_2-D_2)}^{-1} r_{2k}(n)\cdot s_{2M}(n+k)\right]$$

$$b_2(n)=\frac{1}{[p(n)]^{\frac{3}{2}}}\cdot\left[\sum_{k=-(L_1-D_1)}^{-1} r_{1k}(n)\cdot s_{1M}(n+k)\right]$$

Figure 10:
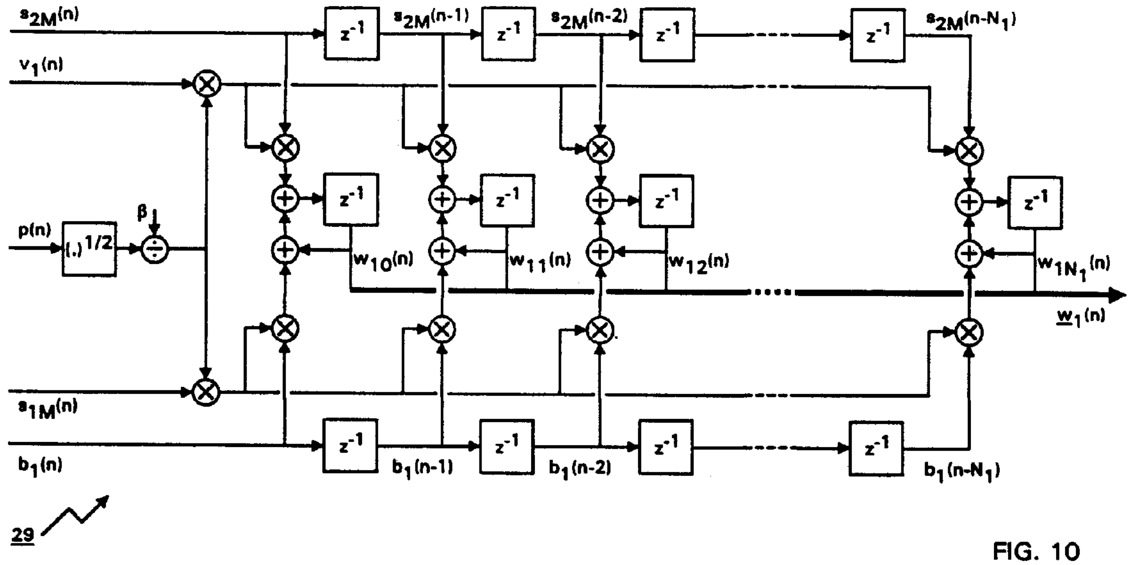

The updating units 29 and 30 are designed in accordance with FIG. 10 and the following relationships are applicable. The adaptation speed β can be selected in correspondence with the desired convergence characteristic.

$$w_{1k}(n+1)=w_{1k}(n)+\frac{\beta}{\sqrt{p(n)}}\cdot[v_1(n)\cdot s_{2M}(n-k)+b_1(n-k)\cdot s_{1M}(n)] \quad (0\le k\le N_1)$$

$$w_{2k}(n+1)=w_{2k}(n)+\frac{\beta}{\sqrt{p(n)}}\cdot[v_2(n)\cdot s_{1M}(n-k)+b_2(n-k)\cdot s_{2M}(n)] \quad (0\le k\le N_2)$$

Figure 11:
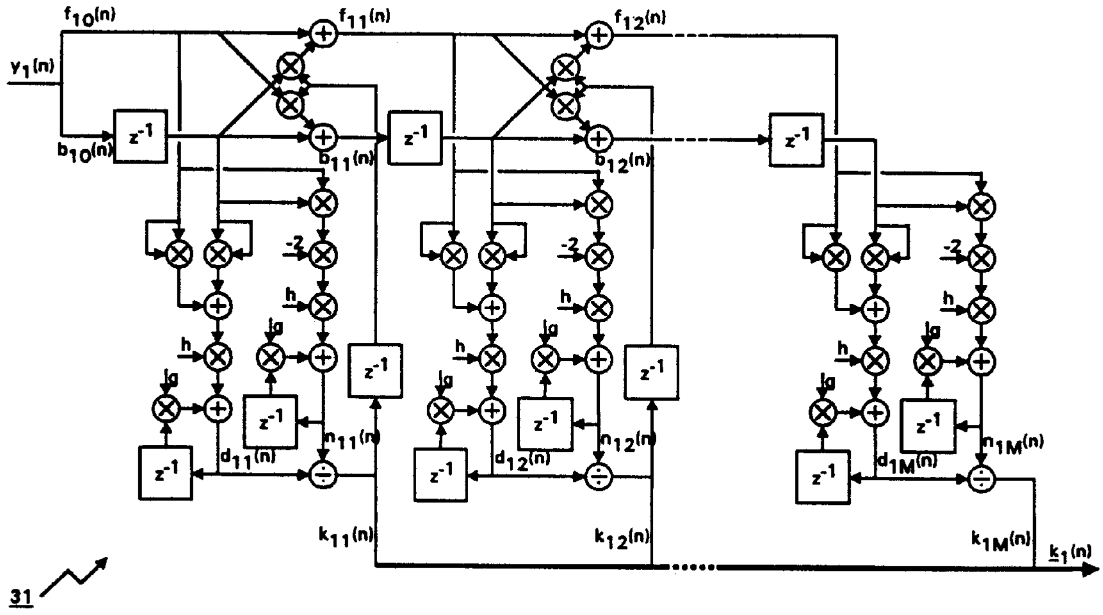

The cross-over element de-correlators 31 and 32 are designed in accordance with FIG. 11 and the following relationships are applicable. The cross-over element de-correlators calculate the coefficient vectors $\underline{k}_1$ and $\underline{k}_2$, which are required for a de-correlation of their input signals.

$$f_{10}(n)=y_1(n)$$

$$b_{10}(n)=y_1(n)$$

-continued $$\left.\begin{aligned} f_{1i}(n)&=f_{1(i-1)}(n)+k_{1i}(n-1)\cdot b_{1(i-1)}(n-1)\\ b_{1i}(n)&=k_{1i}(n-1)\cdot f_{1(i-1)}(n)+b_{1(i-1)}(n-1)\\ d_{1i}(n)&=g\cdot d_{1i}(n-1)+h\cdot[(f_{1(i-1)}(n))^2+(b_{1(i-1)}(n-1))^2]\\ n_{1i}(n)&=g\cdot n_{1i}(n-1)+h\cdot[(-2)\cdot f_{1(i-1)}(n)\cdot b_{1(i-1)}(n-1)]\\ k_{1i}(n)&=\frac{n_{1i}(n)}{d_{1i}(n)}\end{aligned}\right\}(1\le i\le M)$$

$$f_{20}(n)=y_2(n)$$

$$b_{20}(n)=y_2(n)$$

$$\left.\begin{aligned} f_{2i}(n)&=f_{2(i-1)}(n)+k_{2i}(n-1)\cdot b_{2(i-1)}(n-1)\\ b_{2i}(n)&=k_{2i}(n-1)\cdot f_{2(i-1)}(n)+b_{2(i-1)}(n-1)\\ d_{2i}(n)&=g\cdot d_{2i}(n-1)+h\cdot[(f_{2(i-1)}(n))^2+(b_{2(i-1)}(n-1))^2]\\ n_{2i}(n)&=g\cdot n_{2i}(n-1)+h\cdot[(-2)\cdot f_{2(i-1)}(n)\cdot b_{2(i-1)}(n-1)]\\ k_{2i}(n)&=\frac{n_{2i}(n)}{d_{2i}(n)}\end{aligned}\right\}(1\le i\le M)$$

Figure 12:
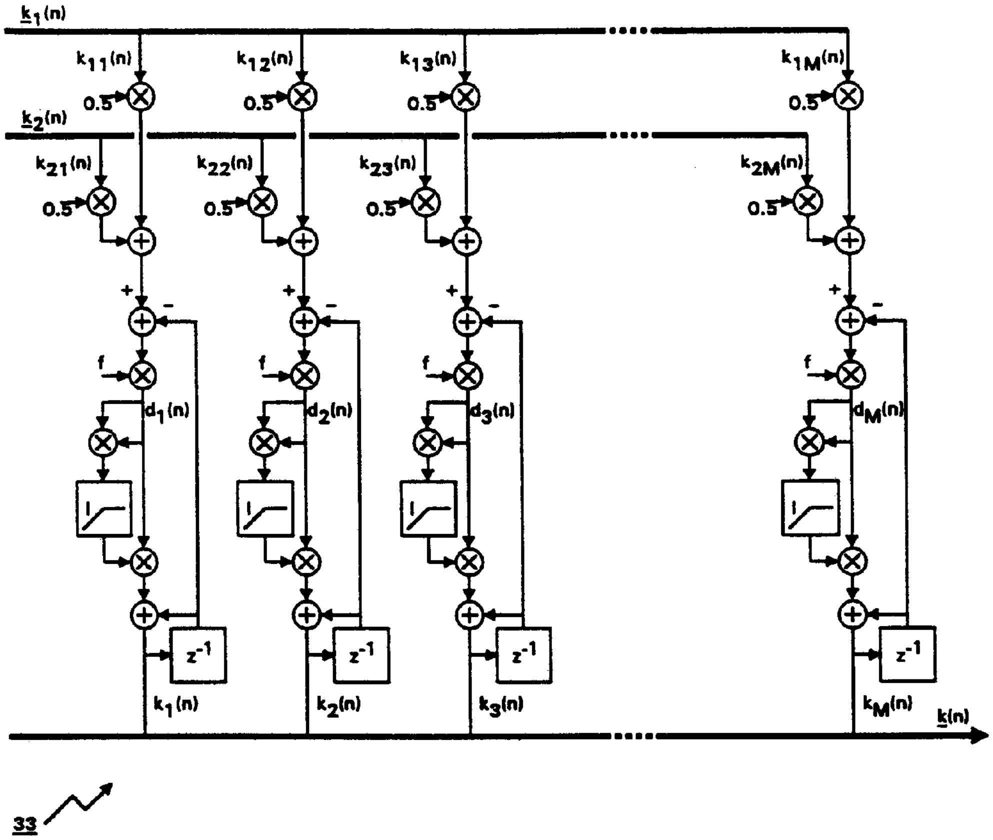

The smoothing unit 33 is designed in accordance with FIG. 12 and the following relationships are applicable. The constants f and l are selected in such a manner, that the averaged coefficients $\underline{k}$ obtain the required smoothed course.

$$\left.\begin{aligned} d_i(n)&=f\cdot\left[\frac{k_{1i}(n)+k_{2i}(n)}{2}-k_i(n-1)\right]\\ k_i(n)&=k_i(n-1)+d_i(n)\cdot\min((d_i(n))^2,l)\end{aligned}\right\}(1\le i\le M)$$

$$f=1.0 \quad l=0.25$$

Figure 13:
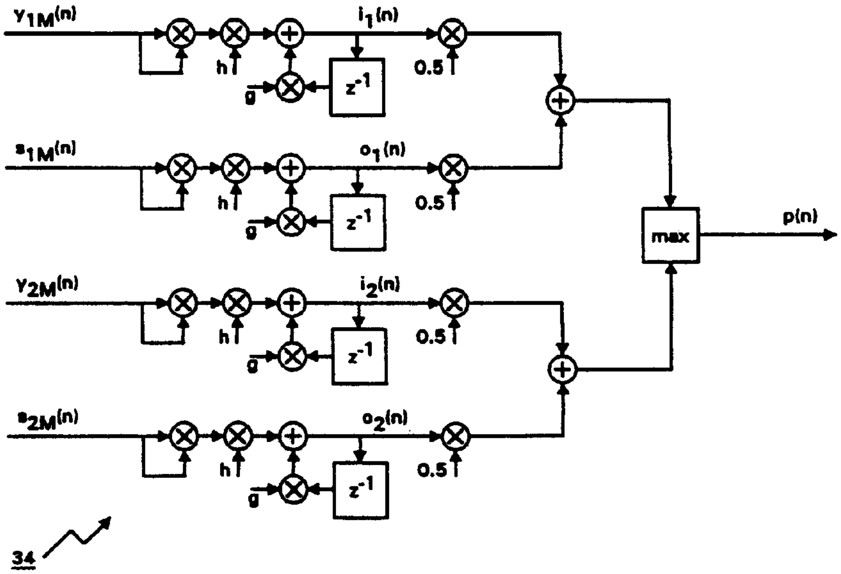

The standardization unit 34 is designed in accordance with FIG. 13 and the following relationships are applicable. First the four powers of $y_{1M}$, $y_{2M}$, $s_{1M}$ and $s_{2M}$ are calculated and from this the standardization value p is determined.

$$i_1(n)=g\cdot i_1(n-1)+h\cdot[y_{1M}(n)]^2$$

$$o_1(n)=g\cdot o_1(n-1)+h\cdot[s_{1M}(n)]^2$$

$$i_2(n)=g\cdot i_2(n-1)+h\cdot[y_{2M}(n)]^2$$

$$o_2(n)=g\cdot o_2(n-1)+h\cdot[s_{2M}(n)]^2$$

$$p(n)=\max\left(\frac{i_1(n)+o_1(n)}{2},\frac{i_2(n)+o_2(n)}{2}\right)$$

The preferred embodiment without any problem can be programmed on a commercially available signal processor or implemented in an integrated circuit. To do this, all variables have to be suitably quantified and the operations optimized with a view to the architecture blocks present. In doing so, particular attention has to be paid to the treatment of the quadratic values (powers) and the division operations. Dependent on the target system, there are optimized procedures for this in existence. These, however, as such are not object of the invention presented here.

What is claimed is:

1. A circuit for the calculation of two de-correlated digital output signals ($s_1$, $s_2$) from two correlated digital input signals ($y_1$, $y_2$), said circuit comprising two filters arranged symmetrically crosswise in a forward direction (17, 18) with adaptive filter coefficients ($w_1$, $w_2$), two retarding elements (7, 8) and two subtractors (9, 10) for calculation of the output signals ($s_1$, $s_2$) within a time range from the input signals ($y_1$, $y_2$), while minimizing a quadratic cost function consisting of cross-correlation terms, wherein the circuit includes four cross-over element filters (19–22) for transformation of the input and output signals ($y_1$, $y_2$; $s_1$, $s_2$) in dependence of the signal and wherein all calculation units for updating of the filter coefficients ($w_1$, $w_2$) are in the circuit following the cross-over element filters (19–22).

2. The circuit in accordance with claim 1, further comprising two cross-correlators (23, 24), four pre-calculation units (25–28) and two updating units (29, 30) for rapid reacting and calculation-efficient updating of the filter coefficients ($w_1$, $w_2$).

3. The circuit in accordance with claim 1, further comprising two cross-over element de-correlators (31, 32), which follow statistics of the input signals ($y_1$, $y_2$), and a smoothing unit (33) for calculation of averaged and smoothed coefficients (k) for the cross-over element filters (19–22).

4. The circuit in accordance with claim 1, further comprising a standardization unit (34), which calculates an optimum standardization value (p) for updating of the filter coefficients ($w_1$, $w_2$).

5. A device for adaptive suppression of noise in acoustic input signals, said device comprising two microphones (1, 2) and two AD—converters (3, 4) for converting acoustic input signals into two digital input signals ($y_1$, $y_2$), a circuit for processing digital input signals ($y_1$, $y_2$) into digital output signals ($s_1$, $s_2$), at least one DA—converter (13, 14) and at least one speaker for converting the digital output signals ($s_1$, $s_2$) into acoustic output signals, wherein the circuit for processing the digital input signals ($y_1$, $y_2$) into digital output signals ($s_1$, $s_2$) is the circuit according to claim 1.

6. The device in accordance with claim 5, further comprising at least one compensation filter (5, 6) for adapting an average frequency response of a microphone (1) to an average frequency response of the other microphone (2).

7. A method for calculating two de-correlated digital output signals ($s_1$, $s_2$) from two correlated digital input signals ($y_1$, $y_2$) using a circuit according to claim 1, whereby by means of two filters arranged symmetrically crosswise in forward direction (17, 18) with adaptive filter coefficients ($w_1$, $w_2$), two retarding elements (7, 8) and two subtractors (9, 10) the de-correlated output signals ($s_1$, $s_2$) are determined within the time range from the input signals ($y_1$, $y_2$) under minimization of a quadratic cost function consisting of cross-correlation terms, and wherein by means of four cross-over element filters (19–22), a transformation of the input and output signals ($y_1$, $y_2$; $s_1$, $s_2$) in dependence of the signal is carried out and for updating of the filter coefficients ($w_1$, $w_2$) only the transformed signals ($y_{1M}$, $y_{2M}$; $s_{1M}$, $s_{2M}$) are utilized.

8. The method in accordance with claim 7, wherein two cross-over element de-correlators (31, 32) follow statistics of the two input signals ($y_1$, $y_2$) and a smoothing unit (33) calculates averaged and smoothed coefficients (k) for the cross-over element filters (19–22).

9. The method in accordance with claim 7, wherein, in a standardization unit (34), an optimum standardization value (p) for the updating of the filter coefficients ($w_1$, $w_2$) is calculated.

10. A method for adaptive noise suppression in acoustic input signals, whereby the acoustic input signals are converted into digital input signals ($y_1$, $y_2$), the digital input signals ($y_1$, $y_2$) are processed into digital output signals ($s_1$, $s_2$) and the digital output signals ($s_1$, $s_2$) are converted into acoustic output signals, wherein for processing of the digital input signals ($y_1$, $y_2$) into digital output signals ($s_1$, $s_2$) the method in accordance with claim 7 is utilized.

11. Method in accordance with claim 10, wherein two microphones (1, 2) are utilized for converting the acoustic input signals, the average frequency response of one microphone (1), by means of at least one compensation filter (5, 6), is adapted to an average frequency response of the other microphone (2).

* * * * *